United States Patent [19]
Youtz et al.

[11] 3,731,329
[45] May 8, 1973

[54] DIE HEAD

[75] Inventors: Donald E. Youtz; Edwin M. Eigenbrode, both of Waynesboro, Pa.

[73] Assignee: Teledyne, Inc., Los Angeles, Calif.

[22] Filed: Dec. 11, 1970

[21] Appl. No.: 97,065

[52] U.S. Cl. ................. 10/121, 408/149, 408/178
[51] Int. Cl. ........................ B23g 1/28, B23g 5/10
[58] Field of Search ............. 10/111, 120, 120.5 R, 10/121, 96, 100, 113, 123; 408/148, 149, 153, 173, 178, 146, 215, 231, 239, 206, 713, 154, 155, 156, 187, 188, 197

[56] References Cited

UNITED STATES PATENTS

| | | | |
|---|---|---|---|
| 1,045,597 | 11/1912 | Oatman | 10/96 R |
| 1,939,490 | 12/1933 | Dixon | 408/146 |
| 2,779,361 | 1/1957 | McKiff | 408/713 X |
| 3,390,596 | 7/1968 | Trevathan | 408/206 X |
| 1,738,847 | 12/1929 | Shearer | 408/197 |
| 1,695,158 | 12/1928 | Shearer | 10/100 |

FOREIGN PATENTS OR APPLICATIONS

| | | | |
|---|---|---|---|
| 183,888 | 5/1907 | Germany | 10/121 |
| 1,411 | 5/1865 | Great Britain | 10/123 |

Primary Examiner—Charles W. Lanham
Assistant Examiner—E. M. Combs
Attorney—Strauch, Nolan, Neale, Nies & Kurz

[57] ABSTRACT

A die head for cutting threads on a workpiece incorporating means permitting replacement of the cutting tools without disassembly of the die head and without removal of the head from the machine tool upon which it is mounted for operation.

1 Claim, 4 Drawing Figures

PATENTED MAY 8 1973

INVENTORS
DONALD E. YOUTZ
EDWIN M. EIGENBRODE

BY
Strauch Nolan Neale Nies + Kurz
ATTORNEYS

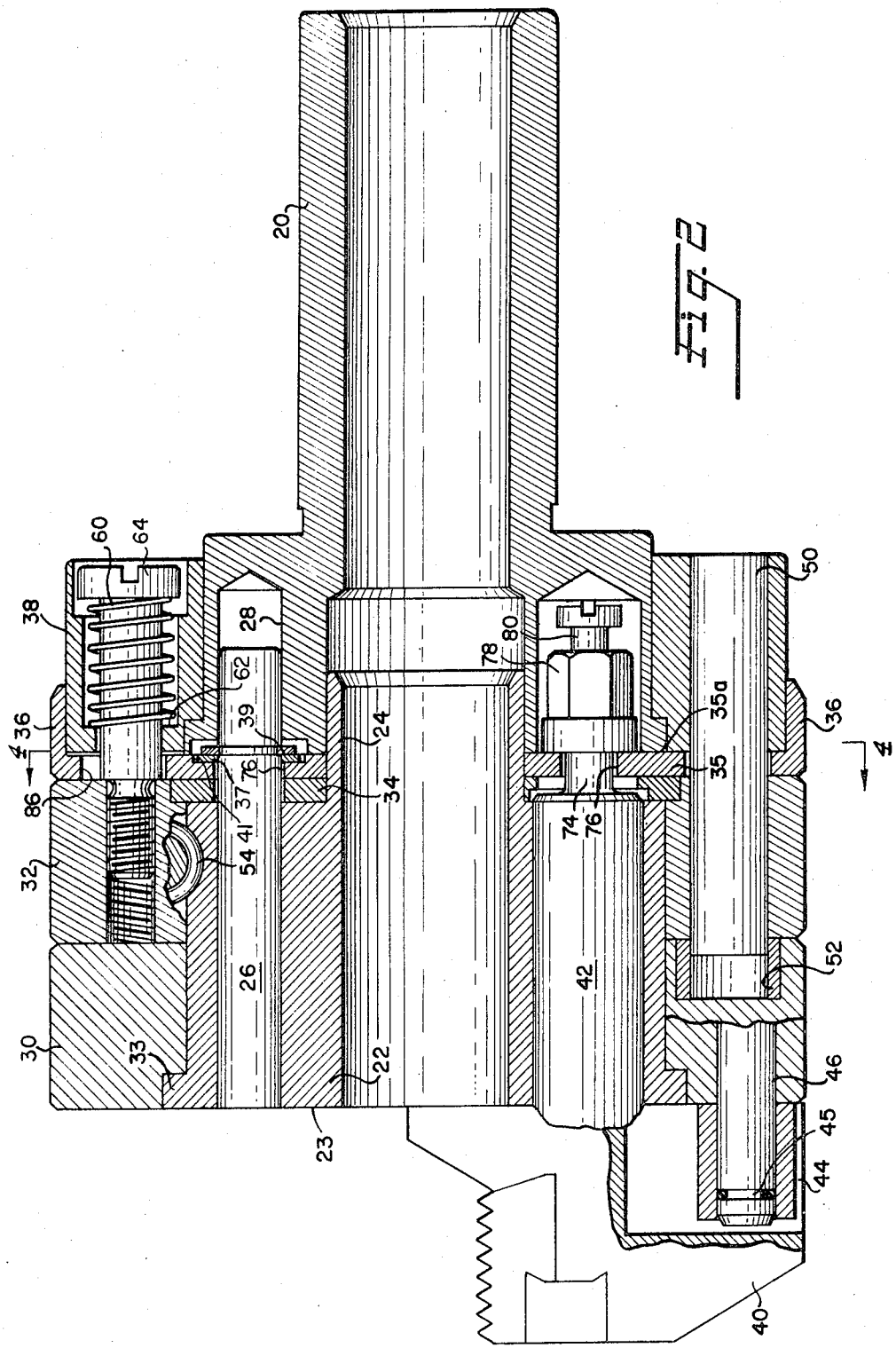

s
DIE HEAD

BACKGROUND OF THE INVENTION

The present invention relates generally to self opening dies of the "pull-off" type. Usually die heads of this type are components of automatic screw machines or turret lathes. Such die heads comprise a rear part adapted for rigid connection to the associated machine tool and a forward part carrying the thread cutting chasers, the two parts being arranged for a limited relative axial movement. In the operation of a die head of this type, the die spindle carrying the die head is advanced axially of the work with the chasers locked in closed position until the desired length of thread has been cut. The advance of the die spindle is then halted while the forward portion of the die head continues to advance since the chasers will screw themselves further on to the work. The resulting separation of the front and rear parts of the die head releases a locking mechanism to permit the chasers to withdraw radially from the work to permit removal of the finished workpiece and the insertion of a new workpiece to be threaded.

Usually four chasers and chaser holder assemblies are employed in this type of head. While the die head itself, as well as the chaser holders, are of extremely rugged construction and require replacement or repair only at infrequent intervals, the chasers themselves inherently have a limited service life and require replacement at relatively frequent intervals. Similarly, replacement of the chasers and chaser holders may be required when the workpiece size is changed.

In prior die heads of this type it has been necessary to remove the entire die head from the machine, then disassemble the head to permit removal and replacement of the chasers. Since the die heads are usually a component of a larger machine the removal of a die head may require the interruption of an entire production line.

SUMMARY OF THE INVENTION

It is a principal purpose and object of the present invention to provide improved thread-cutting die heads in which replacement of the chaser holders may be effected without removal of the die head from the apparatus with which it is associated and without requiring special tools or techniques.

It is also an object of the present invention to provide improved die heads which incorporate a mechanism to facilitate quick change of the chaser holders without adversely affecting the performance of the die head and without significant increase in its cost or complexity.

In die heads of this type the chaser holders have integral trunnions carried by the die head body. To move the chaser holders between "die open" and "die closed" positions the chaser holders are simultaneously and equally rocked about their trunnions to move the cutting edges of the chasers radially toward and away from the axis of the die head.

In accordance with the present invention, a locking member is provided, which, in a first position, locks each of the chaser holder trunnions against axial movement to thus retain the holders in the head, and, in a second position, frees each of the trunnions to permit removal of the holders from the head. The locking member has a portion accessible from the exterior of the die head to permit manipulation of the locking member between its two positions without disassembly of any of the die head parts.

Additional objects and advantages will become apparent as the description proceeds.

THE DRAWINGS

FIG. 2 is a section taken along line 2—2 of FIG. 1;

DESCRIPTION OF PREFERRED EMBODIMENT

Figure 1:
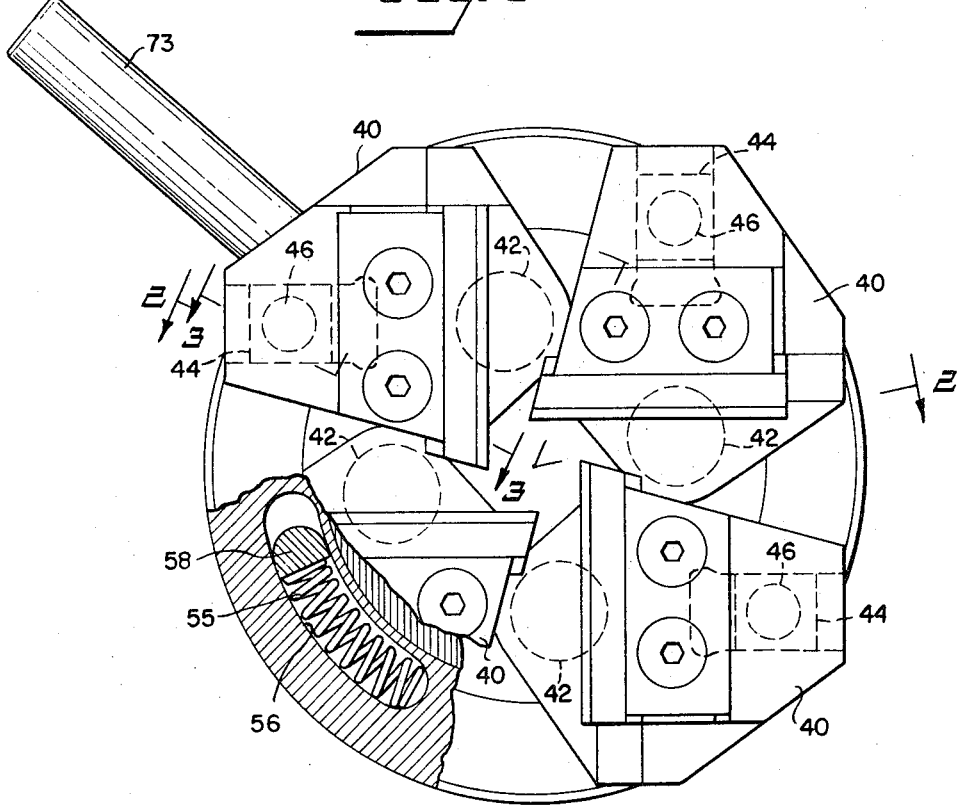
FIG. 1 is a front view of a die head embodying the present invention with parts broken away to show interior details.

Referring now more particularly to the drawings, the die head is provided with a tubular shank 20 adapted to be rigidly secured to a non-rotating tool holding mechanism of a machine tool and supports the entire die head. A head body 22 is mounted on shank 20 for limited axial movement relative to the shank by means of a tubular extension 24 which maintains the parts in coaxial alignment. The head body and the shank are held against relative rotation by driving pins 26 pressfitted into the head body and extending with a close sliding fit into bores 28 in the shank 20. Encircling the head body are a closing ring 30 and an adjusting ring 32 which are held in face-to-face contact with the closing ring against flange 33 on the head body by a spacer plate 34 which may be shimmed as required. Also mounted for limited rotation on the head body against a rear surface of the adjusting ring is a retainer plate 35 having a rearwardly extending external flange 36 surrounding a portion of the periphery of an operating ring 38 encircling the enlarged body portion of the shank member 20.

The retainer plate 35 is held in axial position by washers 37 held in place on pins 26 by snap rings 39, the washers being received in recesses 41 on the plate 35. As is apparent from the description hereinabove and from FIGS. 2 and 3, the abutment surface 35a of plate 35 is spaced a predetermined distance from the locating surface 23 of body 22.

The chaser holders 40 are provided with trunnions 42 rotatably received in bores in the head body 22. The trunnions are releasably held against axial movement by the retainer plate 35 as described below. As in conventional prior die heads of the type with which the invention is concerned, the rearward surfaces of the chaser holders slidably engage the locating surface 23 of body 22, and this is clearly shown in FIG. 2.

Slide blocks 44 pivotally carried by pins 46 pressfitted into the closing ring 30 are received in slots on the rearward surfaces of the chaser holders 40. The slide blocks are each frictionally held in proper axial position by an O-ring 45. The chaser holders are rotated between open and closed positions by limited rotation of the closing ring 30. The closing ring 30 is normally held in closed position by a pair of locking pins 50 press-fitted into the operating ring and slidably extending through the adjusting ring into bushings 52 provided in blind bores in the closing ring. The final position of the chasers may be adjusted by operation of a worm 54 carried by the adjusting ring and partially engaged with the head body. Adjustment of the worm rotates the adjusting ring carrying with it the closing ring.

In operation, assuming that the die is closed, and that the chasers are in engagement with a workpiece and that the die head and the workpiece are being relatively rotated and axially shifted, the workpiece threading operation will progress until the desired length of thread is formed on the workpiece. At that time the workpiece will continue to rotate, but axial advancement of the head shank 20 will be stopped. The retainer plate 35, the head body 22, the closing ring 30 and the adjusting ring 32 will continue to move to the left. This movement will continue until the locking pins 50 are free of the bushings 52. As soon as this occurs, the closing ring will be partially rotated by a spring 55 received in an arcuate recess 56 in the adjusting ring and acting against a pin 58 projecting rearwardly from the closing ring. As the die parts are separated, springs 60 compressed between an annular face 62 on the operating ring 38 and the head of a screw 64 threaded into the adjusting ring will be further compressed. Usually two spring assemblies 60 are provided, one being shown in FIG. 2.

Figure 3:
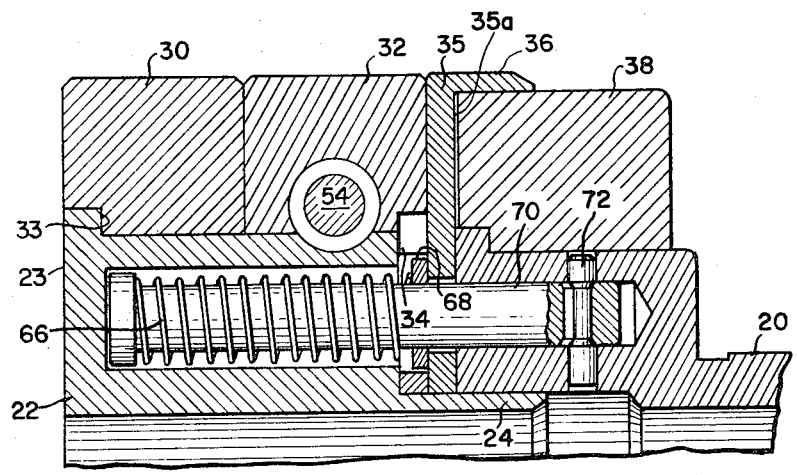
FIG. 3 is a fragmentary section taken along line 3—3 of FIG. 1.

Also compressed during the separating action of the die parts is a spring 66 extending between a washer 68 bearing against the retainer plate 35 and the head of a pin 70 received in a recess of the head body and pinned to the shank 20 as at 72. Again, to assure balanced action the die head usually includes two of the pin and spring assemblies, one of which is shown in FIG. 3.

As soon as the chasers are disengaged from the workpiece, the springs 66 urge the assembly comprising the retainer plate 35, the adjusting ring 32, the closing ring 30 and the head body 22 to their original axial positions. Since the ends of pins 50 are out of registry with the bushings 52 and engage the end face of the closing ring 30 the operating ring will be displaced to the right slightly from the position shown in FIG. 2. The die head may then be closed by automatic or manual rotation of the closing ring 30 to bring the bushings 52 into registry with the ends of the pins 50. An external handle 73 may be provided on the closing ring for this purpose. The springs 60 will then be released to displace the operating ring 38 to the left and the parts will again occupy the position shown in FIG. 2.

The mechanism for releasably retaining the chaser-chaser holder assemblies, which forms an important aspect of the present invention, will now be described with particular reference to FIGS. 2 and 4. As shown in FIG. 2, the trunnions 42 are provided with reduced neck portions 74 which extend through openings 76 in the retainer plate 35. A nut 78 on the trunnion extension 74 engages the rear surface 35a of the retainer plate, the adjustment of the nut determining the trunnion clearance, since the abutment surface 35a is spaced a predetermined distance from the locating surface 23. A lock screw 80 holds the nut 78 in adjusted position.

Figure 4:
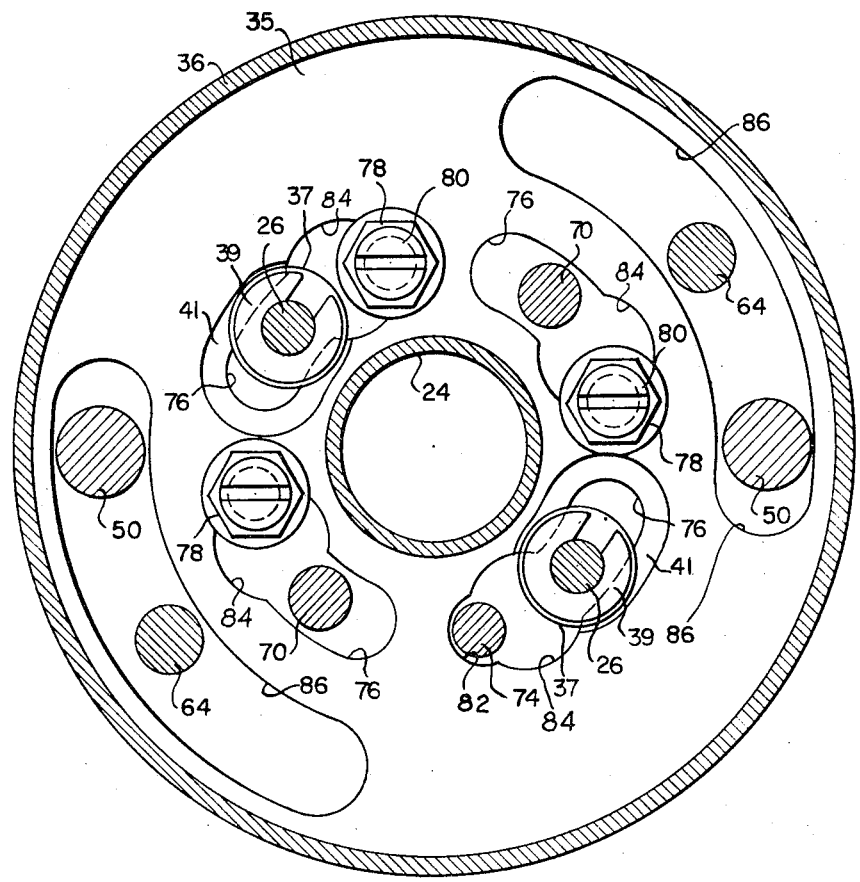
FIG. 4 is a transverse section taken along line 4—4 of FIG. 2.

As shown in FIG. 4, the openings 76 in the retainer plate are circumferentially elongated and include a radially narrow portion 82 having a radial width slightly greater than that of the trunnion neck portion but substantially less than the width of the base of the nut 78. The openings 76 also have an enlarged essentially circular portion 84, the diameter of which is slightly greater than that of the base of nut 78. Accordingly, when the retainer plate is rotated to bring the opening portion 82 adjacent the trunnion neck 74, the trunnions and the associated chaser-chaser holder assemblies will be held against axial movement. When the retainer plate is rotated to dispose the center of enlarged portion 84 in alignment with the axis of the trunnions, the entire chaser-chaser holder assembly may be freely withdrawn. The slide blocks are retained on the pin 46 by the O-rings 45. Inasmuch as the four openings 76 each occupy an identical relationship with the associated trunnion all four chaser-chaser holders are simultaneously locked in place or are released, depending upon the rotated position of the retainer plate. To facilitate rotation of the retainer plate the external flange 36 is provided with a knurled surface. If desired, suitable detents may be provided to hold the retainer plate in locking position or to enable the operator to determine when the release position has been reached.

It will be noted that the retainer plate is provided with circumferentially elongated openings 86 to permit rotation of the plate without interference with the locking pins 50 and the screws 64. Similarly, the elongation of the openings 76 permits the desired rotation of the retainer plate without interference with the driving pins 26.

In practice, when it is desired for any reason to change the chaser-chaser holder assemblies, a spare set of chasers will be properly assembled, the chasers will be properly positioned within the holders and the nuts 78 will be locked on the trunnions in the desired position. When the retainer plate is rotated from one limit position to another, the chaser-chaser holder assemblies will be withdrawn, the new chaser holders will be inserted into the mechanism, and the retainer plate returned to its initial position. The trunnion clearance will be automatically correct. The chasers will also similarly be in the correct position to permit immediate resumption of the operation of the head.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The embodiment of the invention in which an exclusive property or privilege is claimed is defined as follows:

1. A thread cutting die head comprising a head body assembly having a locating surface on its front face, a plurality of chaser holders having trunnions extending into journals in said head body assembly in a direction essentially parallel to the axis of said head, said trunnions mounting said holders for rocking movement about the axis of said trunnions, said chaser holders having surfaces adapted to slidably engage said locating surface, means carried by said body for simultaneously rocking each of said holders about the axes of said trunnions to move said chaser holders radially between open and closed positions, a retaining plate mounted for rotation on said head body assembly in a plane normal to the axis of said trunnions and adjacent the inner ends of said trunnions, said retaining plate having an abutment surface a predetermined distance from said locating surface, and cooperating means on said trunnions and said plate including adjustable means on said trunnions engageable with said abutment surface operative in a first rotated position of said retaining plate to hold said trunnions against axial displacement with said surfaces of said holders in light frictional contact with said locating surface on said head while permitting rotation of said trunnions and operative in a second rotated position to release said trunnions for axial movement without changing the radial position of said chaser holders, said retaining plate having a portion accessible from the exterior of said die head to permit manipulation of the retaining plate between said first and second positions without disassembly of the die head.

* * * * *